UNITED STATES PATENT OFFICE.

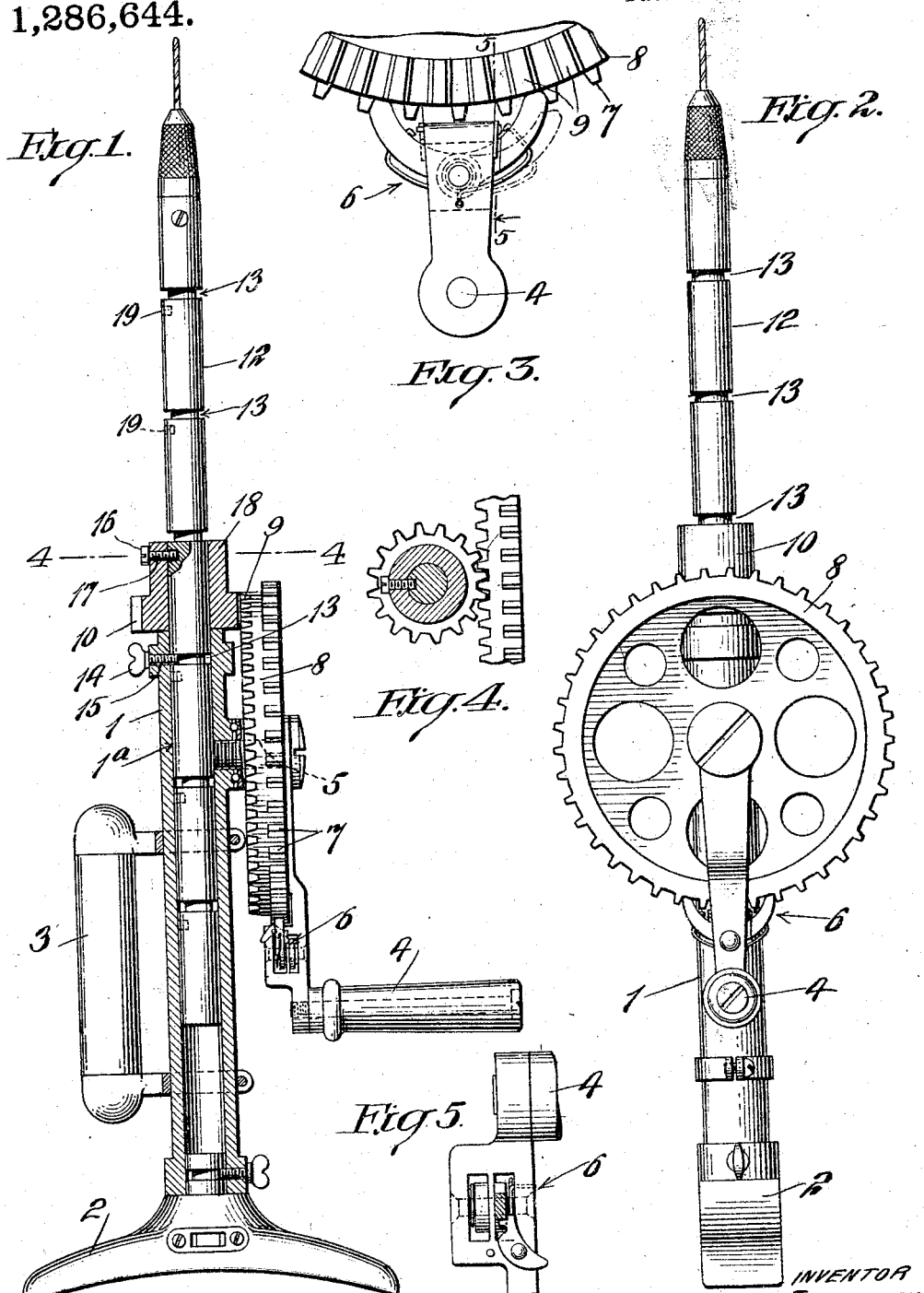

THEODORE JABLONOWSKI, OF JERSEY CITY, NEW JERSEY.

BORING AND DRILLING DEVICE.

1,286,644.  Specification of Letters Patent. Patented Dec. 3, 1918.

Application filed May 28, 1918. Serial No. 237,032.

*To all whom it may concern:*

Be it known that I, THEODORE JABLONOWSKI, a citizen of the United States, and resident of Jersey City, in the county of Hudson and State of New Jersey, have invented certain new and useful Improvements in Boring and Drilling Devices, of which the following is a specification.

This invention relates to improvements in boring and drilling devices and particularly to means for permitting the adjustment of the drill spindle in relation to the stock.

It furthermore consists in the construction and arrangement of parts hereinafter described and more particularly pointed out in the claims hereto appended.

In the accompanying drawings, in which similar reference characters designate corresponding parts throughout the several views, Figure 1, is a side elevation, partly in section of a boring drill embodying my invention;

Fig. 2, is another side elevation at right angles to the elevation shown in Fig. 1;

Fig. 3, is an enlarged detail of the ratchet mechanism for operating the driving gear of my said boring drill.

Fig. 4, is a section on the line 4—4 of Fig. 1, and Fig. 5, is a section on the line 5—5 of Fig. 3.

Referring now to these drawings, 1 indicates a stock, cylindrical in shape, having a cylindrical bore 1$^a$, a breast piece 2, and a supporting handle 3, by which it may be held with one hand while the other operates a crank 4, loosely mounted on the axle 5, on the side of the stock 1, and having mounted contiguous to its outer end a double acting pawl or ratchet 6, adapted to mesh with teeth 7, on a drive gear 8, also mounted to rotate on the axle 5. Said gear 8, is also provided with teeth 9 on the side thereof which mesh with a pinion 10, mounted upon and fixed by any suitable means, on the drill spindle 12, which is mounted to rotate within the stock 1. Obviously when the pinion 12 is rotated by the drive gear 8, the spindle 12 will be rotated within the stock.

For the purpose of adjusting the length of the drill spindle, it is provided with a series of transverse peripheral grooves 13 and these grooves are adapted to engage in and coöperate with a transversely movable device mounted on the stock and extending within the bore 1$^a$ thereof, so as to engage with any one of said series of grooves 13.

As shown the transverse movable device comprises a set screw 14, mounted in a screw threaded bore 15, cut transversely through the wall of the stock 1.

Any suitable means for securing the pinion 10 to the drill spindle 12, may be employed and as shown I provide a set screw 16 which extends through a bore 17, in an extension 18 of said spindle, and engages with any one of a series of sockets 19 formed contiguous to the grooves 13.

The operation of my improved drill is as follows:

When it is desired to extend or adjust the length of the spindle in relation to the stock, the set screw 14 is screwed out and the set screw 16 is also loosened or screwed out, whereupon the spindle may be moved into or out of the stock longitudinally. The desired groove and socket are brought into alinement with the set screws 14 and 16 and these set screws are screwed home. Obviously the set-screw 16 will secure the pinion to the spindle and the end of the set screw 14 will extend within the groove below the same to such an extent only as to permit free rotation of the drill but to prevent longitudinal movement thereof. Having the drill spindle adjusted suitably in relation to the stock, the drill is operated in the conventional manner by holding the supporting handle 3, with one hand, using the breast to press against the breast piece 2, and turning the crank 4, with the other hand.

Having described my invention, I claim:

1. In a boring tool, the combination with a stock, having a cylindrical bore; a drill spindle mounted to rotate axially within said stock and having a series of peripheral grooves; a pinion fixed on said spindle; a driving gear mounted to rotate upon the side of the stock and meshing with said pinion; means for rotating said driving gear and movable means on the stock extending into the bore thereof and adapted to engage with either of said grooves to permit free rotation of the spindle in relation to the stock, but to prevent longitudinal relative movement therebetween.

2. In a boring tool, the combination with a stock, having a cylindrical bore; a drill spindle mounted to rotate axially within said stock and having a series of peripheral grooves; a pinion fixed on said spindle; a driving gear mounted to rotate upon the side of the stock and meshing with said pinion; means for rotating said driving gear and a set screw mounted in the stock and adapted to engage within one of said grooves to prevent longitudinal movement of the spindle in relation to the stock but to permit free rotation of the spindle within said stock.

Signed at borough of Manhattan, city of N. Y. in the county of New York and State of New York, this 16 day of May A. D. 1918.

THEODORE JABLONOWSKI.

Witnesses:
BERNARD ALBLY,
STALLO VINTON.